R. T. NEWTON.
AUTOMOBILE BUMPER.
APPLICATION FILED MAR. 12, 1920.
1,379,414.
Patented May 24, 1921.
3 SHEETS—SHEET 1.
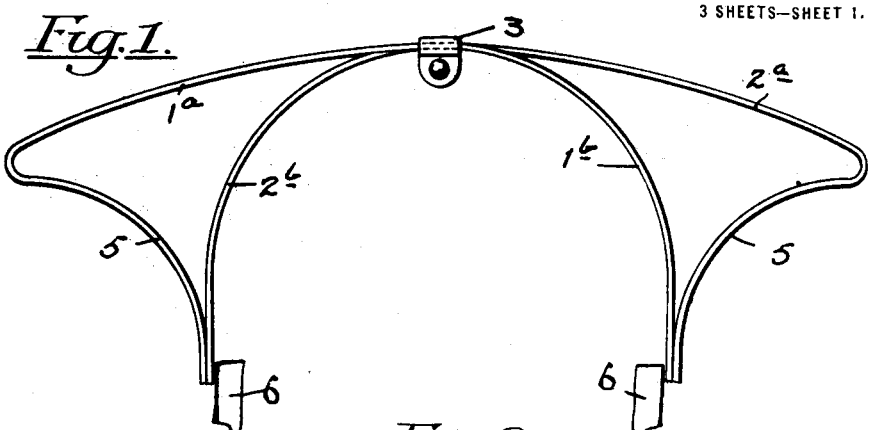
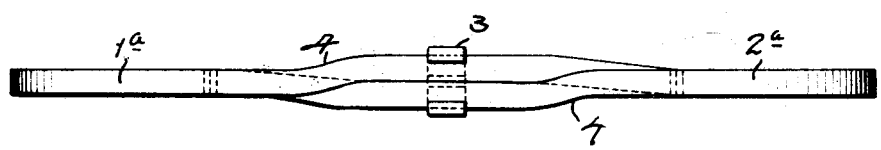
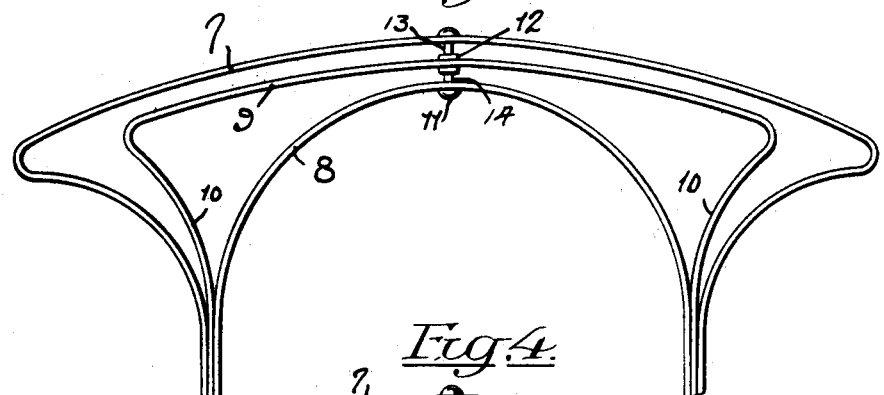
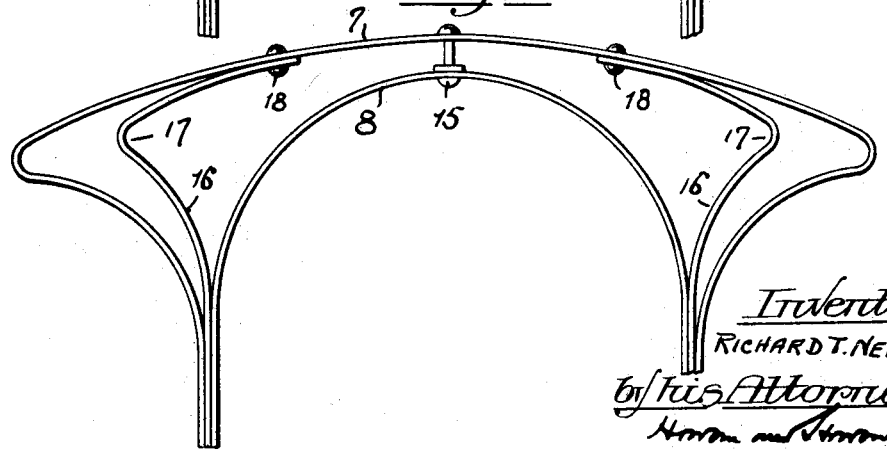
Inventor
RICHARD T. NEWTON
by his Attorneys

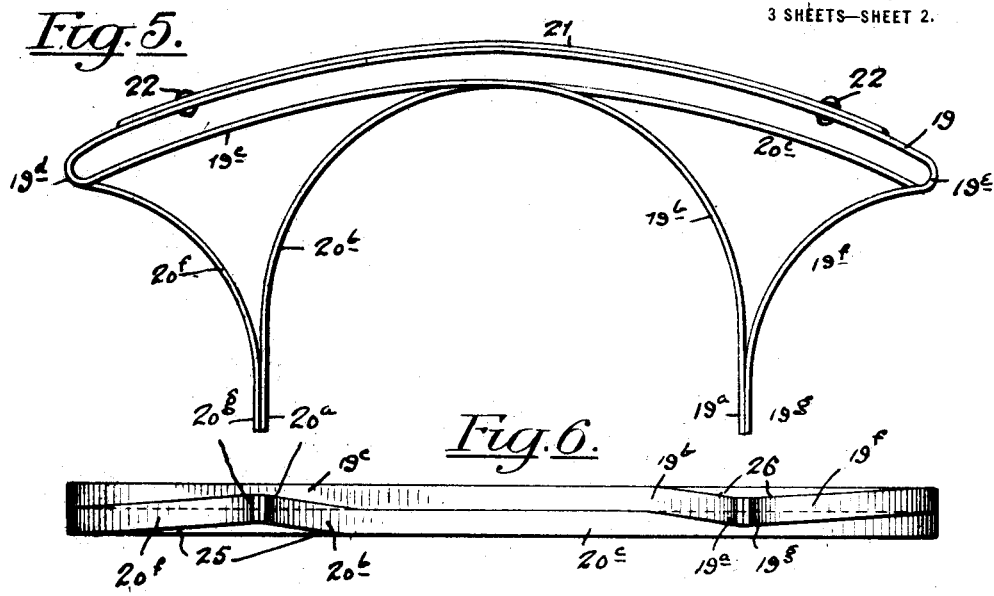
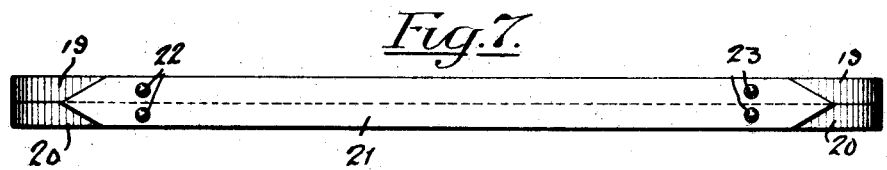
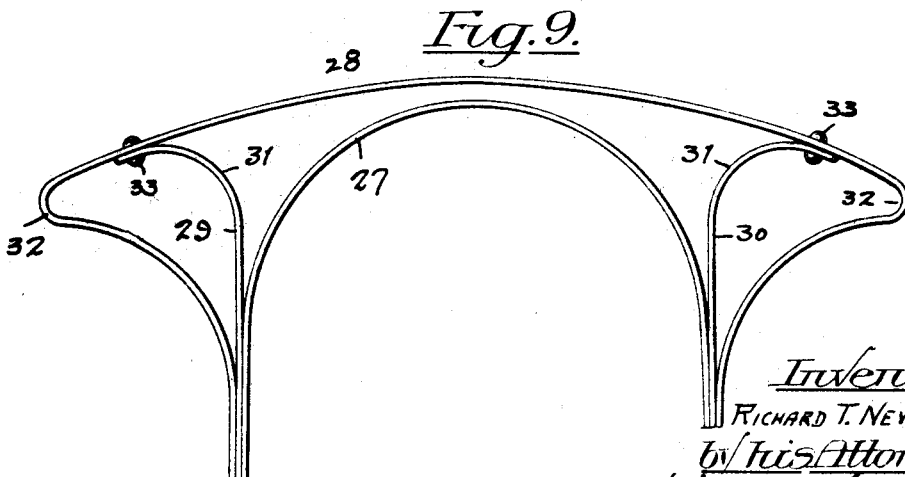

R. T. NEWTON.
AUTOMOBILE BUMPER.
APPLICATION FILED MAR. 12, 1920.

1,379,414.

Patented May 24, 1921.

Inventor
Richard T. Newton
by his Attorneys

UNITED STATES PATENT OFFICE.

RICHARD T. NEWTON, OF NEW YORK, N. Y.

AUTOMOBILE-BUMPER.

1,379,414.     Specification of Letters Patent.     Patented May 24, 1921.

Application filed March 12, 1920. Serial No. 365,188.

*To all whom it may concern:*

Be it known that I, RICHARD T. NEWTON, a citizen of the United States of America, residing in the city, county, and State of New York, have invented certain new and useful Improvements in Automobile-Bumpers, of which the following is a specification.

My invention relates to automobile bumpers, and particularly to bumpers of the spring metal type. The object of my invention has been to devise various forms of construction which embody the same general principles as, or are related to, that of my co-pending application Ser. No. 143,815, filed January 22, 1917; some of the new constructions presenting features of greater economy in manufacture, others greater flexibility, other greater rigidity, but all embodying to a greater or less degree the underlying thoughts disclosed in my prior application.

In the accompanying drawings—

Figure 1 is a plan, and Fig. 2 is a front elevation, of a bumper in which my invention is embodied in one form;

Fig. 3 is a plan of a modification thereof;

Fig. 4 is a plan of a further modification thereof;

Fig. 5 is a plan of another modification;

Fig. 6 is a rear elevation of the latter;

Fig. 7 is a front elevation thereof;

Fig. 8 is a front elevation showing the impact plate replaced by clips;

Fig. 9 is a plan of another modification;

In the construction shown in my earlier application, the impact element of the bumper comprises a spring band or bands extending across the front of the vehicle and recurved at its opposite ends to the chassis side bars. The impact member is supported by an inner arch, either in one or two pieces, but independent of the impact member, and also having its ends carried back to the chassis side bars. This construction has been found extremely satisfactory in actual practice, and the present modifications serve merely to illustrate different ways of accomplishing substantially similar action, or somewhat modified action, which in some instances may be desirable either from a technical or a practical standpoint.

Figure 12:
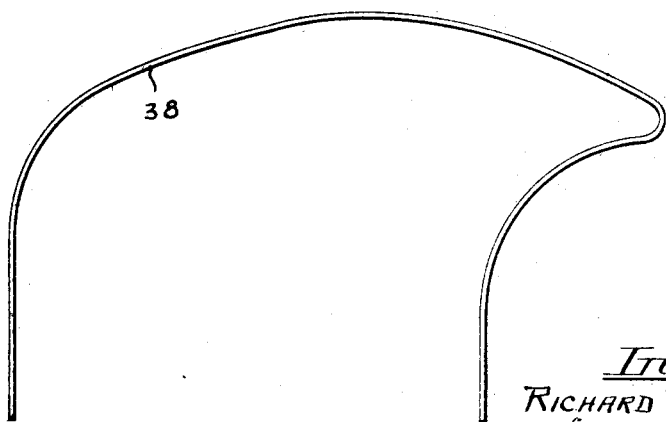
Fig. 12 is a plan of one of the spring members.

In Figs. 1 and 2 I have shown a bumper, which in plan, presents substantially the same appearance as the bumper of my earlier bumper above mentioned. It will be noted, however, that the impact and arch elements of the bumper are not formed independently, but that they are a composite of two straps, each of which forms a portion of the impact member, and also a portion of an arch member. Thus, one strap which has a portion $1^a$ forming the left-hand portion of the impact member of the bumper, is carried sharply downward from the mid clamp 3, and forms at $1^b$ one side of the reinforcing arch. Similarly, the portion $2^a$ of the other strap forms the other half of the impact element, while its incurved portion $2^b$ completes the reinforcing arch. The shape of each strap in plan is generally indicated in Fig. 12. In the form shown in Figs. 1 and 2, however, the two straps are offset at 4 (Fig. 2) to permit their overlapping or intersecting areas at the mid-section of the bumper to be placed vertically in register, at which point they are engaged by the clamp 3. The impact portions $1^a$ and $2^a$ of the straps terminate at opposite ends of the bumper in return bends carried back on an ogee curve 5 to the chassis side bars 6, to which they are attached in any suitable manner, as, for instance, by a U-bolt or by a clamp of the type shown in my Patent No. 1,315,789, dated September 9, 1919. It is quite obvious that upon thrust against a bumper of this construction substantially the same reinforcement of the impact element by the inner arch is afforded as in the construction illustrated in the application above mentioned.

In Fig. 3 I have shown another modification, which differs from my earlier construction, principally in that I have interposed an intermediate spring member 9 between the impact spring 7 and the reinforcing arch 8. The ends of each of the three spring members of the bumper are carried back and secured to the chassis side bar as before. The intermediate spring member 9 is of the same general type as the impact member 7, but of less width, so that its recurved ends 10 are bowed to a less degree than the ends of the impact member 7. It is therefore somewhat stronger than the latter. The three spring straps are united at the center of the impact area by a rivet 11 clamped at 12 to the intermediate strap 9, but have a lost motion engagement through the necks 13 and 14 with the impact element 7 and the arch member 8 respectively. This construction affords a more gradual reinforcement upon deflection of the impact member. Thus, the strap 7, when deflected, opposes at first only its own strength. As soon as it is deflected sufficiently to bear against the intermediate member 9, the latter adds its opposition to further deflection. Finally, when both impact and intermediate members are deflected sufficiently to bear against the arch 8, the latter adds its strength to the resistance of the bumper. In case of a glancing or lateral blow against the bumper, however, the three springs cooperate at once and are simultaneously deflected by reason of their interengagement at the rivet 11.

In Fig. 4 the impact member 7 and the arch 8 are spaced apart and united with lost motion through the rivet 15. The intermediate strap 9 is, however, replaced by a pair of independent side springs 16, the curvature of the chassis end of which is less than the end bends of the impact member, while the opposite ends of the straps are curved at 17 into engagement with the impact member to which they are rigidly united by rivets 18. In a construction of this sort the support of the impact member 7 by the springs 16 is constant, while the resistance of the arch 8 is not brought into play until the deflection of the reinforced impact member has been sufficient to bring it into engagement with the crown of the arch.

In Figs. 5, 6 and 7 the construction of the spring straps is further modified so that the opposite ends of each strap are brought together and secured to one side bar of the chassis. Thus, the strap 19, starting at the chassis side bar leg 19$^a$ is carried toward the center of the bumper to form one side, 19$^b$, of the reinforcing arch, and is extended across to the opposite side of the bumper, forming at 19$^c$ a reinforcing member behind the impact area of the strap. It is then recurved at 19$^d$, carried back on a gradual curve to form one impact element extending the entire width of the bumper, and is again recurved at its opposite end 19$^e$ to form the ogee leg 19$^f$ supporting the right-hand end of the impact element of the bumper, the leg 19$^f$ terminating at 19$^g$ parallel to the end 19$^a$ and held with the latter to one side of the chassis side bars. The other spring strap 20 is of identical shape, but is reversed in position, and is arranged with its impact reach vertically alined with that of the strap 19, while its supporting legs 20$^a$ and 20$^g$ are arranged alongside the opposite chassis side bar and secured thereto. In order to hold the two straps in juxtaposition, a front plate 21 of a width corresponding to that of the bars 19 and 20 combined is arranged in front of the impact area of the bumper, and is secured to the two straps by rivets 22 and 23.

As shown in Fig. 8, the front plate 21 may be substituted by clips 24 arranged at convenient points.

In order to bring the strap ends into parallel at the chassis side bars, it is desirable to offset the attaching legs from the planes of the two spring straps. This is shown at 25 and 26 in Fig. 6.

The construction of Fig. 9 is closely related to that shown in Fig. 4, and differs therefrom mainly in that the arch 27 is not secured to the impact strap 28, while the reinforcing straps 29 and 30 have their bends 31 faced in opposite direction to the end bend 32 of the impact member. They are secured in like manner by rivets 33 to the impact member and reinforce the latter.

Figure 10:
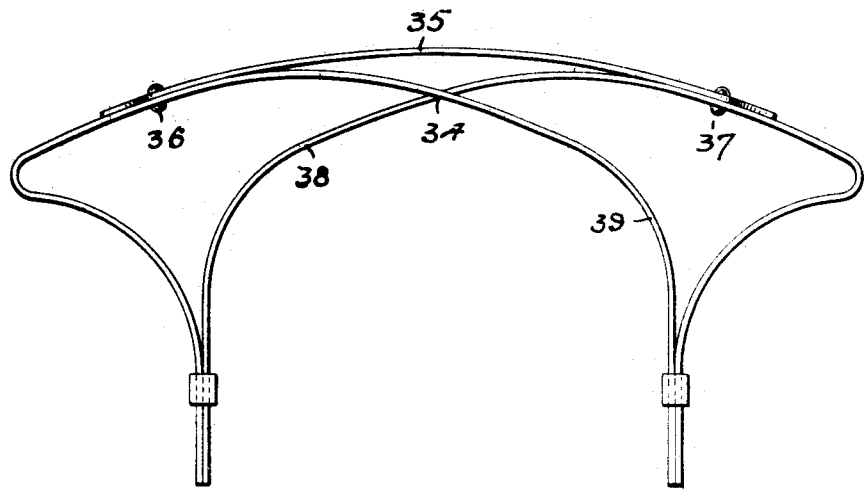
Fig. 10 is a plan of a still further modification.
Figure 11:
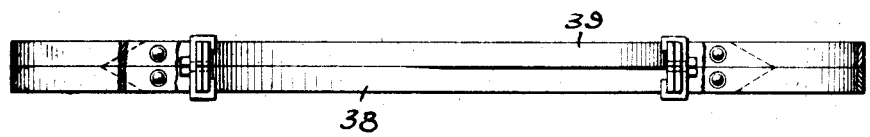
Fig. 11 is a rear elevation thereof.

In Figs. 10, 11 and 12, the construction is quite like that of Figs. 1 and 2, with the distinction that there is no mid clamp at the intersection 34 of the curved spring straps, and that the impact member of the bumper is formed in large part by an independent strap 35 secured by rivets 36 and 37 to both of the main spring straps 38 and 39. Slightly greater flexibility is secured in this construction than in that first described, since the arch comes gradually into play as the impact member 35 is driven inward, thus flattening the crown of the arch until the impact member is supported throughout its length by the portions of the bars 38 and 39 which lie behind it.

While I have shown the arch and impact members of the bumper of one piece, it will be readily understood that they may be of overlapped pieces, or of pieces bracketed together as suggested in my application above mentioned. Variations in detail of construction will readily occur to those skilled in the art which do not depart from what I claim as my invention.

I claim—

1. An automobile bumper having an impact member and a mid supporting arch, said bumper comprising a pair of overlapping spring straps, each shaped to form portion of the impact member of the bumper and portions of the supporting arch.

2. An automobile bumper having an impact member and a mid supporting arch, said bumper comprising a pair of overlapping spring straps, each shaped to form portion of the impact member of the bumper and portion of the supporting arch, the free ends of said straps extending in parall to the chassis.

3. An automobile bumper having an impact member and a mid supporting arch, said bumper comprising a pair of overlapping spring straps, each shaped to form portion of the impact member of the bumper and portion of the supporting arch, together with means for uniting the impact areas of said straps.

4. An automobile bumper comprising a pair of spring straps, each having legs adapted to extend toward the chassis for support, and having their intermediate body portions shaped on intersecting curves.

5. An automobile bumper comprising a pair of spring straps, each having legs extending toward the chassis for support, and having their intermediate body portions shaped on intersecting curves, together with means connecting said body portions.

6. An automobile bumper comprising a pair of impact members arranged, at least in part, at different heights, each of said impact members having a pair of legs extending toward the chassis for support.

7. An automobile bumper comprising a pair of impact members arranged, at least in part, at different heights, each of said impact members having a pair of legs extending toward the chassis for support, said legs affording, in effect, spring end and mid supports for the impact area of the bumper.

8. An automobile bumper comprising a pair of impact bars each having two supporting legs, each of said legs being offset intermediate its associated impact bar and its point of support.

9. An automobile bumper comprising a pair of impact bars each having two supporting legs, each of said legs being offset intermediate its associated impact bar and its point of support, and serving to present the impact bars at different heights.

10. A bumper comprising a pair of impact bars having at least portion thereof arranged at different heights, in combination with a pair of supporting legs for each bar.

11. A bumper comprising a pair of impact bars having at least portion thereof arranged at different heights, in combination with a pair of supporting legs for each bar, together with means engaging said legs to rigidly support the same from the chassis.

12. A bumper comprising a pair of impact bars having at least portion thereof arranged at different heights, in combination with a pair of supporting legs for each bar, said supporting legs comprising, in plan view, a pair of outwardly divergent members extending toward the opposite ends of the bumpers, and a second pair of inwardly converging arms approaching the mid area of the bumper.

In testimony whereof I have signed my name to this specification.

RICHARD T. NEWTON.